United States Patent Office 2,961,349
Patented Nov. 22, 1960

2,961,349
PROCESS FOR FIXING PIGMENTS ON FIBROUS MATERIALS

Hugo Bartl, Herbert Bestian, Helmut Diery, Johannes Heyna, and Alfred Rückert, all of Frankfurt am Main, Germany, assignors to Farbwerke Hoechst Aktiengesellschaft vormals Meister Lucius & Bruning, Frankfurt am Main, Germany, a corporation of Germany No Drawing. Filed Aug. 16, 1957, Ser. No. 678,533

Claims priority, application Germany Aug. 21, 1956

6 Claims. (Cl. 117—161)

It is known to use urea and melamine precondensation products with aldehydes per se or in admixture with polymerization compounds or natural high molecular substances as binding agents for the fixation of pigments on textile materials. Furthermore it is known to use for the same purpose polyfunctional ethylene imine compounds per se or in admixture with polymerization compounds or natural high mloecular substances. Such precondensates have also been used for the pigment fixation together with polymers, especially such containing reactive hydrogen atoms, and polyfunctional ethylene imine compounds.

Patent application 504,095 relates to a process for fixing pigments on fibrous materials wherein aqueous solutions of alkali-soluble resinous condensates obtained by reacting polyvalent acids with polyhydric alcohols and containing reactive carboxyl groups, are applied to the fibrous material, if desired, in admixture with other natural or artificial resins and/or softening agents, together with pigments and polyfunctional compounds the functional groups of which contain a three-membered ring system containing a nitrogen atom, and wherein the fibrous material is then dried or steamed for a short time, if necessary, at a raised temperature.

It has now been found that the fastness to washing and solvents can further be improved by applying to the fibrous material water-soluble precondensation products obtained from phenol, urea or the derivatives thereof or melamine with aldehydes, in addition to the pigments, the alkali-soluble resinous condensates containing reactive carboxyl groups, the polyfunctional ethylene imine compounds and other additional substances, if desired. The fixation may be carried out by steaming or dry heating to temperatures above 70° C., advantageously to temperatures above 100° C.

In order to further improve the fastness to dry rubbing there may additionally be used natural or synthetic latices on the butadiene, acrylic ester or vinyl ester basis. Since the resinous condensate as a macromolecular acid has, after drying the prints, a hardening action upon the aldehyde precondensates when using volatile alkalies, it is generally not necessary to add potentially acid hardening agents, such as the ammonium salts of mineral acids. A better fastness of the printing paste is obtained when such hardening agents are not used. Furthermore, the danger of a deterioration of the fibre is thereby reduced to a minimum.

As alkali-soluble resinous condensates (see Scheiber "Chemie und Technologie der künstlichen Harze," Stuttgart, 1943, pages 295 et seq.) there come into consideration incompletely condensed reaction products of polyhydric alcohol and polyfunctional acids which are alkali-soluble owing to their content of free carboxyl groups. There may, for example, be mentioned incompletely condensed reaction products of phthalic anhydride and pentaerythrite or hexane-triol-(1.3.5). The resinous condensates are preferably used in the form of their salts with volatile basic compounds, for example ammonia, mono-, di-, or tri-ethanolamine. The resinous condensates may contain condensed therein, in addition to polyfunctional carboxylic acids, also saturated or unsaturated monocarboxylic acids or, in addition to polyhydric alcohols, monohydric long-chain alcohols, for example cetyl alcohol.

As polyfunctional ethylene imine compounds there come, for example, into consideration compounds of the formula

wherein R represents a polyvalent aliphatic, isocyclic or heterocyclic radical, $x$ represents one of the groups —NH—CO—, —CO—, —SO$_2$—, —O—CO— or —O—CH$_2$—, and wherein $n$ indicates that the ethylene imine radical should be present at least twice, or compounds of the formula

wherein R represents a polyvalent radical, such as —CO—, —SO$_2$—, —SO—, =PO—, =PS—, —(CH$_2$)$_2$—NH—CO—CO—NH—(CH$_2$)$_2$— or

and wherein $n$ indicates that the ethylene imine radical should be present at least twice.

There may also be used compounds of the general formula

, a=homologs or derivatives wherein R represents the radical of a primary aliphatic amine containing 4–10 carbon atoms or of a primary amine of the cycloaliphatic series or an aliphatic, aromatic or cycloaliphatic hydrocarbon, or a radical

wherein X means alkyl or cycloalkyl and Y aryl or cycloalkyl, or a radical

wherein X means alkyl and Y aryl or cycloalkyl, X and Y forming together with the nitrogen atom a heterocyclic ring system. They can be obtained according to German specification 854,651 and patent application 659,481. There may be named by way of example: the reaction products from phosphoric acid amide dichlorides, and 2 mols of ethylene imine, for example from phosphoric acid-n-butylamide dichloride, phosphoric acid isohexyl-amide dichloride, phosphoric acid isooctylamide dichloride, phosphoric acid decylamide dichloride, phosphoric acid cyclohexylamide dichloride, phosphoric acid N-methylcyclohexylamide dichloride, phosphoric acid ethylanilide dichloride, phosphoric acid tetrahydroquinolide dichloride, butyl phosphonic acid dichloride, isohexyl phosphonic acid dichloride, decyl phosphonic acid dichloride, phenyl phosphonic acid dichloride, cyclohexyl phosphonic acid dichloride, etc. There come into consideration for the reaction apart from ethylene imine also the homologs thereof, such as propylene imine, 2,2-dimethyl-ethylene imine, phenylethylene imine, etc.

There may also be used mixtures of different alkylene imine compounds which contain two or more alkylene imine groups, or mixtures of alkylene imine compounds of the kind hereinbefore described with mono-alkylene imine compounds.

As precondensation products from phenol, urea or melamine and aldehydes there are preferably used the etherified or non etherified methylol compounds of urea, alkylated ureas or melamine. Furthermore there are suitable, for example tetramethylolacetylene diurea and condensation products from phenols or alkylphenols and formaldehyde.

As thickening agents there come into consideration for example: alginates, vegetable mucilages, carob bean flour, dextrin, cellulose ether carboxylic acids, salts of polyacrylic acid, polyvinyl alcohol etc. If these substances are used, account should be taken of the fact that the addition of larger amounts of these substances causes an undesirable hardening of the prints. To obtain prints which can be used immediately without being after-treated, it is advantageous to use thickening agents which have been prepared by emulsifying a water-insoluble or only sparingly water-soluble organic solvent in water in such a manner that these solvents are present in the inner phase. By the additional use of such known oil-in-water emulsions the advantages of purely aqueous printing pastes or dyebaths, such as the capacity of being diluted with water, easy cleaning of the machine parts, reduced inflammibility in comparison with water-in-oil emulsions etc., are retained, whereas the disadvantages of the use of swellable thickening agents, such as stiffening of the handle, inferior fastness to washing and rubbing, less brilliance and poorer yield are avoided. However, there may also be used mixtures of swellable thickenings and oil-in-water emulsions, whereby in some cases an improvement of the stability of the printing pastes or padding liquor is obtained.

To obtain such highly viscous and ductile oil-in-water emulsions, there are for example suited hydrocarbons such as benzine, diesel oil, toluene, xylol, etc. as well as chlorinated hydrocarbons and oil of turpentine. The boiling point of these solvents should preferably not be below 70° C. The upper limit of the boiling point is advantageously chosen in such a manner that the solvents volatilize as completely as possible when drying the material. When additionally using water-insoluble resins as binding agents they may be emulsified in the solutions or dispersions of the resinous condensates or dissolved in the solvent being necessary in order to obtain the emulsion.

The oil-in-water emulsions can be prepared in the known manner by stirring the organic solvent into an aqueous emulsifier solution, for example an aqueous solution of proteins or oxyethylated compounds. However, it is also possible to mix while stirring vigorously, the aqueous solution of the salt of a resinous condensate serving simultaneously as emulsifier, in small portions, if necessary, in the presence of a protective colloid, with the organic solvent.

If the pigment padding process is to be used, it is not necessary in all cases to add a thickening agent.

As pigments there may be mentioned, inorganic pigments, such as titanium dioxide, zinc oxide, iron oxides, carbon black, ultramarine, lead colours, or bronze powders such, for example, as aluminium, copper or brass, either in the finely powdered state or in the form of lamellae or scales, and organic pigments, for example, vat dyestuffs, azo-dyestuffs and phthalocyanines.

As materials to be printed, there come into consideration, for example, sized or unsized paper, natural or regenerated cellulose, acetyl-cellulose, animal fibres, synthetic fibres of polyacrylonitrile, polyvinyl chloride, polyamides, polyesters, glass fibres, asbestos fibres, leather, artificial leather, feathers and foils of all kinds.

The ratio of the amount advantageously used of the precondensation products from phenol, urea and melamine on the one hand and aldehydes on the other, to the amount of the alkali-soluble resinous condensates used is about 1:4 to 1:1. When the above-mentioned precondensation products are additionally used, the amount of alkali-soluble resinous condensates and poly-functional ethylene imine compounds can be reduced, generally by 20–30%. If the pigment dying process is to be used, it is possible to increase the ratio of the precondensation product to the alkali-soluble resinous condensate up to 3:2.

After applying the printing pastes or padding liquors to the material to be printed according to the usual printing and dying process and subsequent drying, the fixation is carried out by steaming under neutral or acid conditions or by dry heating to temperatures above 70° C., advantageously at temperatures above 100° C.

The addition of the condensation products from phenol, urea or the derivatives thereof or melamine and aldehydes in admixture with alkali-soluble resinous condensates and poly-functional ethylene imine compounds, being additionally used according to the process of the present invention, improves considerably the fastness to washing and solvents, especially in fabrics of regenerated cellulose, this being of special importance in dry cleaning.

The following examples serve to illustrate the invention but they are not intended to limit it thereto, the parts being by weight.

EXAMPLE 1

50 parts of an ammonium caseinate solution of 25% strength are mixed with 50 parts of an aqueous ammoniacal solution of 30% strength of the condensation product prepared from 1 mol of hexane-triol-(1:3:5) and 1.2 mol of phthalic anhydride, 3 parts of an alkyl-aryl polyglycol ether and 10 parts of an aqueous solution of 50% strength of ammonium thiocyanate, 750 parts of an aliphatic hydrocarbon having a boiling range of 180–230° C. are emulsified into this mixture, while adding in portions 137 parts of water. There is obtained a mobile oil-in-water emulsion.

*Composition of the printing paste*

735 parts of the emulsion described above are mixed with
150 parts of an aqueous ammoniacal solution of 30% strength of the condensation product prepared from 1 mol of hexane-triol-(1.3.5) and 1.2 mol of phthalic anhydride,
50 parts of an aqueous triturated mass of 40% strength of copper phthalocyanine,
25 parts of a benzene solution of 80% strength of the reaction product of phosphorus oxychloride and 3 mols of ethylene imine, and
40 parts of an aqueous solution of 65% strength prepared from a precondensate of melamine, ethylene glycol and formaldehyde.

1000 parts

A fabric of staple fibers is printed by machine printing with the printing paste so obtained, dried and then heated for 10 minutes at 140° C. A blue print of fastness to washing and trichlorethylene is obtained.

EXAMPLE 2

*Composition of the printing paste*

- 770 parts of the emulsion described in Example 1 are mixed with
- 100 parts of an aqueous ammoniacal solution of 30% strength of the condensation product obtained from 1 mol of hexane-triol-(1.3.5) and 1.2 mol of phthalic anhydride,
- 40 parts of an aqueous triturated mass of 40% strength of highly chlorinated copper phthalocyanine,
- 30 parts of phosphoric acid ethylanilide diethylene imide and
- 60 parts of an aqueous solution of 50% strength of hexamethylol-melamine partially etherified with methanol.

1000 parts

A mixed fabric of viscose and acetate rayon is printed by machine printing with the printing paste so obtained, dried and then heated for 5 minutes at 130° C. A green print of fastness to washing is obtained. The same effect is obtained when steaming, instead of heating, for 10 minutes in a rapid ager.

EXAMPLE 3

*Composition of the printing paste*

- 810 parts of the emulsion described in Example 1 are mixed with
- 120 parts of an aqueous triturated mass of 30% strength of lampblack,
- 30 parts of an aqueous dispersion of 45% strength of a copolymer of 60% of butadiene and 40% of acrylo-nitrile,
- 20 parts of phosphoric acid diethylamide diethylene imide and
- 20 parts of an aqueous solution of 50% strength of tetramethylol-acetylene diurea.

1000 parts

A fabric of polyester fiber is printed with the printing paste so obtained, dried and then heated for 3 minutes at 170° C. There is obtained a black print of fastness to washing and rubbing.

EXAMPLE 4

*Composition of the printing paste*

- 350 parts of a solution of 30% strength of the condensation produce obtained from 1 mol of hexane-triol-(1.3.5) and 1.2 mol of phthalic anhydride in monoethanolamine and water are ground with
- 250 parts of titanium dioxide. This paste is mixed with
- 100 parts of an aqueous dispersion of 50% strength prepared from the copolymer of 70% of acrylic acid butylester and 30% of vinyl chloride,
- 50 parts of a sodium alginate thickening of 4% strength,
- 150 parts of the emulsion described in Example 1,
- 30 parts of phosphoric acid-n-butylamide-diethylene imide,
- 70 parts of an aqueous solution of 65% of the pre-condensate of melamine, ethylene glycol and formaldehyde.

1000 parts

A dark blue pre-dyed mixed fabric of staple fibres and viscose is printed with the printing paste so obtained, dried and then heated for 10 minutes at 140° C. There is obtained a covering white print of fastness to abrasion and to the solvents generally used in dry cleaning.

EXAMPLE 5

*Composition of the printing paste*

- 835 parts of the emulsion described in Example 1 are mixed with
- 100 parts of an aqueous ammoniacal solution of 30% strength of the condensation product prepared from 1 mol of hexane-triol-(1.3.5) and 1.2 mol of phthalic anhydride,
- 25 parts of an aqueous triturated mass of 40% strength of the trans-form of the condensation product obtained from naphthaline tetracarboxylic acid and O-phenylene-diamine,
- 10 parts of the reaction product of phosphorus oxychloride and 3 mols of ethylene imine,
- 10 parts of the reaction product of phosphorus trichloride and 3 mols of ethylene imine, and
- 20 parts of an aqueous solution of 50% strength of hexamethylol-melamine.

1000 parts

Splits are printed by screen printing with the paste so obtained and dried for 20 minutes at 70° C. A bright orange print is obtained meeting the requirements of fastness made on leather articles.

EXAMPLE 6

*Composition of the padding liquor*

- 30 parts of an aqueous ammoniacal solution of 30% strength of the condensation product prepared from 1 mol of hexane-triol-(1.3.5) and 1.2 mol of phthalic anhydride are mixed with
- 3 parts of an aqueous triturated mass of 40% strength of the coupling product of tetrazotized 3,3'-dichlorobenzidine and 2 mols of aceto-acetylamino-chlorohydroquinone ether,
- 50 parts of an aqueous sodium alginate thickening of 4% strength,
- 15 parts of an aqueous dispersion of 50% strength of polyvinyl acetate,
- 20 parts of triethylene imine phospine oxide and
- 20 parts of an aqueous solution of 65% of the pre-condensate of melamine, ethylene glycol and formaldehyde, and the liquor is then made up to 1000 parts with water.

A fabric of staple fibers is padded with the dye liquor so obtained, dried and then heated for 10 minutes at 140° C. There is obtained a golden-yellow dyeing of fastness to light, washing and solvents.

EXAMPLE 7

- 50 parts of an aqueous preparation of 40% strength of copper phthalocyanine are mixed with
- 130 parts of an aqueous ammoniacal solution of 50% strength of phthalic acid pentaerythrite ester (acid number 175),
- 35 parts of a benzene solution of 80% strength of the reaction product of phosphorus oxychloride and 3 mols of ethylene imine,
- 128 parts of an ammonium caseinate solution of 25% strength,
- 1 part of triethanolamine,
- 5 parts of an alkyl-aryl polyglycol ether,
- 60 parts of an aqueous solution of 50% strength of a hexamethylol-melamine-methyl ether,
- 171 parts of water, and
- 420 parts of an aliphatic hydrocarbon having a boiling range of 190–220° C. are emulsified into this mixture.

1000 parts

A fabric of cotton and staple fibers is printed by machine printing with the mobile printing paste so obtained, dried and then heated for 5 minutes at 150° C. There

We claim:

1. A process for fixing a pigment on a fibrous material which comprises applying to the fibrous material a pigment, a resinous alkali-soluble condensation product of a polybasic organic acid and a polyhydric aliphatic alcohol containing reactive carboxyl groups and dissolved in an alkaline medium, a polyfunctional ethylene imine compound containing at least two reactive ethylene imine groups, and a water-soluble precondensation product of formaldehyde and a member selected from the group consisting of phenol, alkylphenol, urea, diurea, alkylurea and melamine, drying and heating the impregnated material.

2. A process as claimed in claim 1, wherein a partially etherified methylol compound of urea is used as water-soluble precondensation product.

3. A process as claimed in claim 1, wherein a partially etherified methylol compound of an alkylated urea is used as water-soluble precondensation product.

4. A process as claimed in claim 1, wherein a partially etherified methylol compound of melamine is used as water-soluble precondensation product.

5. A process for fixing a pigment on a fibrous material which comprises applying to the fibrous material a pigment, a resinous alkali-soluble condensation product of a polybasic organic acid and a polyhydric aliphatic alcohol containing reactive carboxyl groups and dissolved in an alkaline medium, a polyfunctional ethylene imine compound containing at least two reactive ethylene imine groups, and a water-soluble precondensation product of formaldehyde and a member selected from the group consisting of phenol, alkylphenol, urea, diurea, alkylurea and melamine, in the presence of a thickening agent.

6. A process as claimed in claim 5, wherein an oil-in-water emulsion of an organic solvent only sparingly soluble in water is used as thickening agent.

References Cited in the file of this patent

UNITED STATES PATENTS

| | | |
|---|---|---|
| 2,317,965 | Bestian et al. | Apr. 27, 1943 |
| 2,471,396 | Light | May 24, 1949 |
| 2,494,810 | Hobday et al. | Jan. 17, 1950 |
| 2,540,048 | Hill | Jan. 30, 1951 |
| 2,586,188 | Van Wirt et al. | Feb. 19, 1952 |
| 2,760,945 | Bodenschatz et al. | Aug. 28, 1956 |
| 2,762,718 | Kleiner et al. | Sept. 11, 1956 |